Sept. 30, 1952  J. D. HEIDE ET AL  2,612,430
CYCLE TIME RECORDER

Filed Feb. 5, 1949  4 Sheets-Sheet 1

INVENTORS
JOHN D. HEIDE
JOHN E. FELDMAN
BY Henry P. Truesdell
ATTORNEY

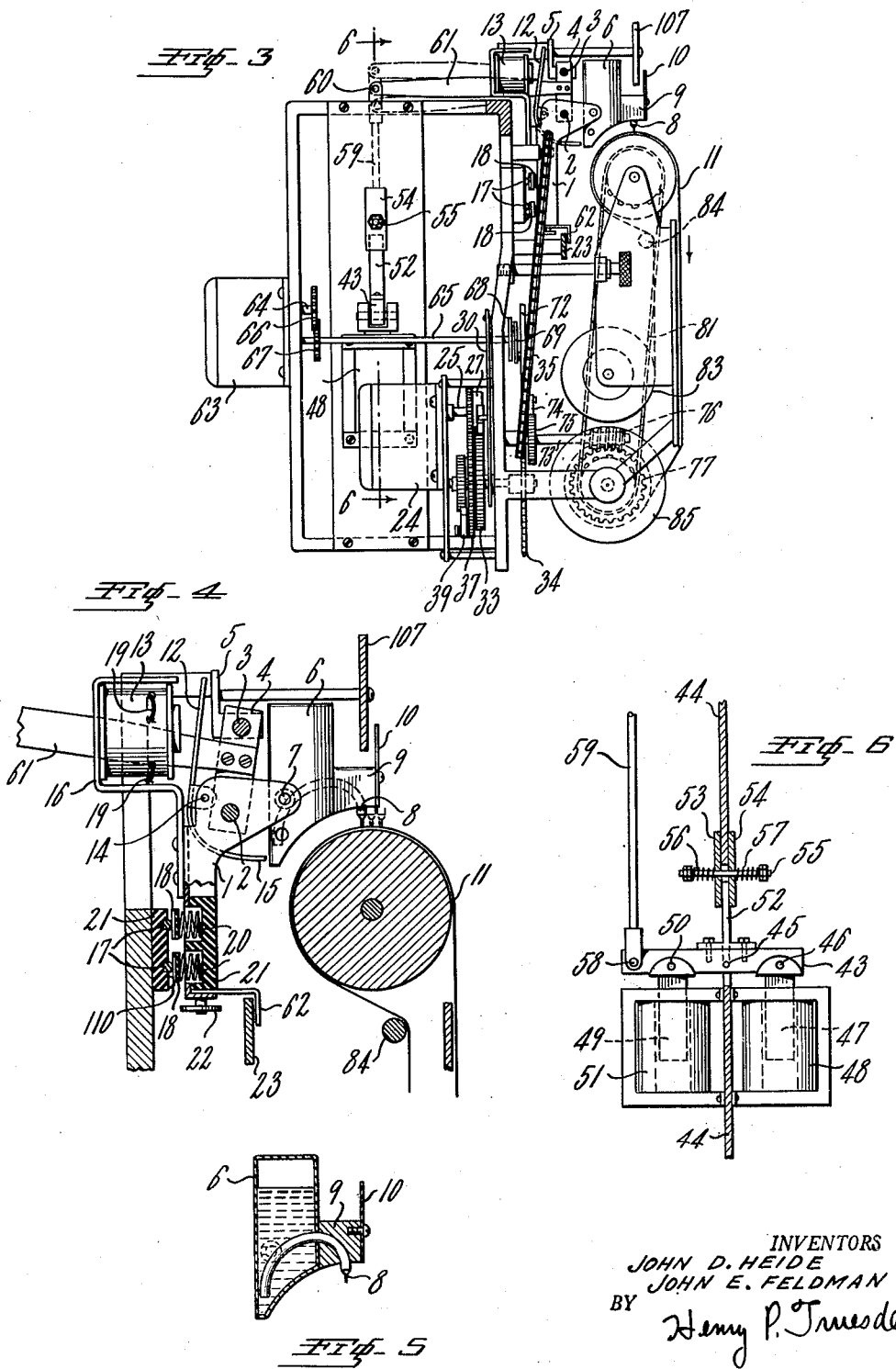

Sept. 30, 1952 J. D. HEIDE ET AL 2,612,430
CYCLE TIME RECORDER
Filed Feb. 5, 1949 4 Sheets-Sheet 3
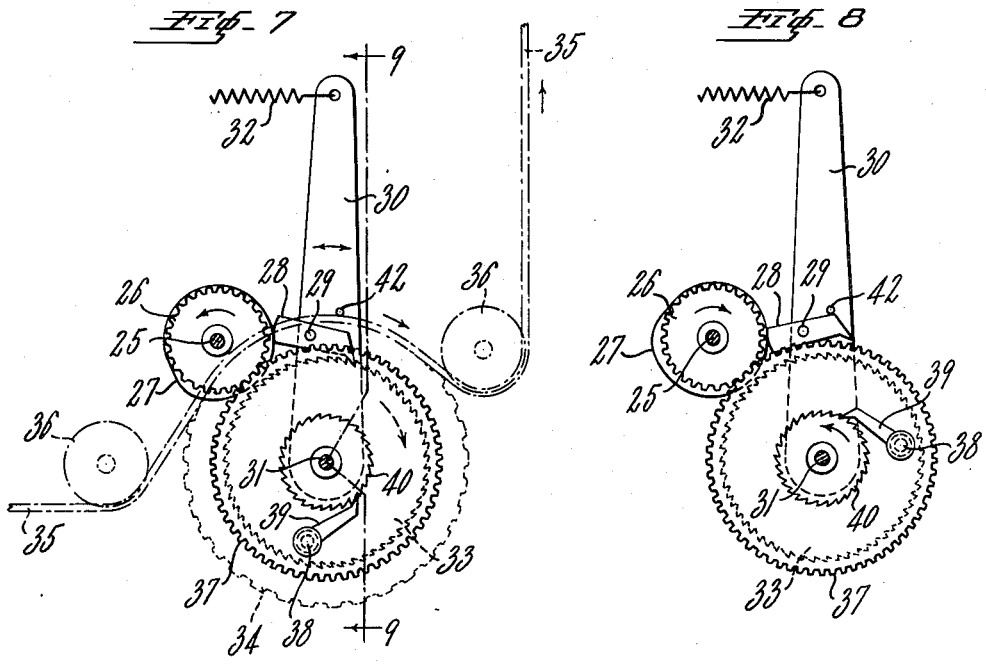
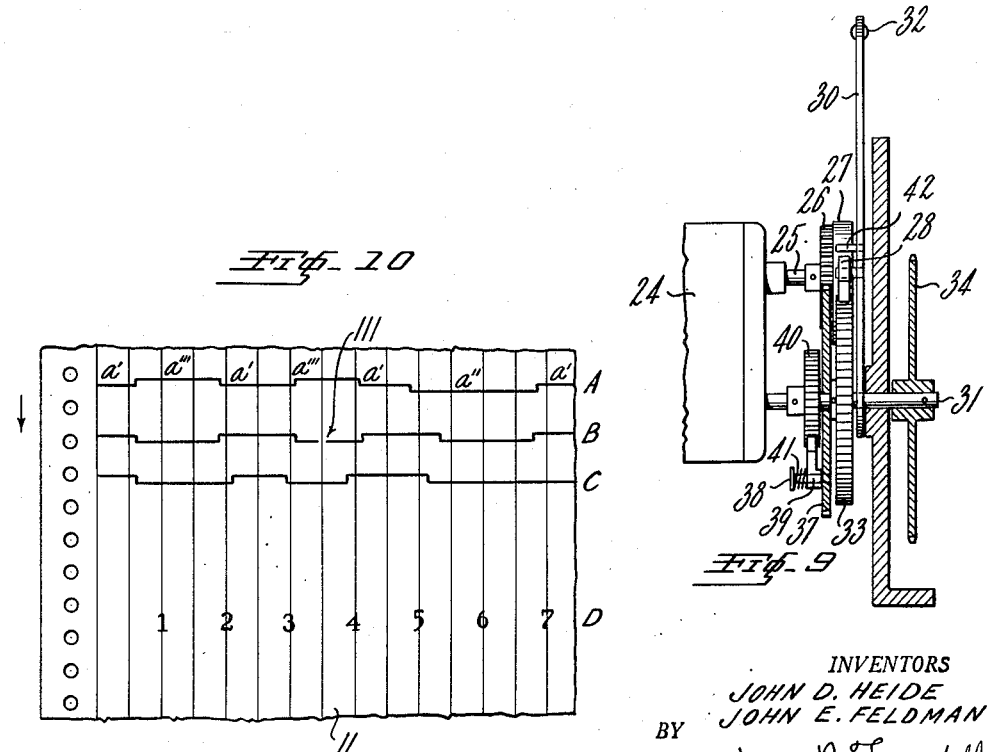
INVENTORS
JOHN D. HEIDE
JOHN E. FELDMAN
BY Henry P. Truesdell
ATTORNEY

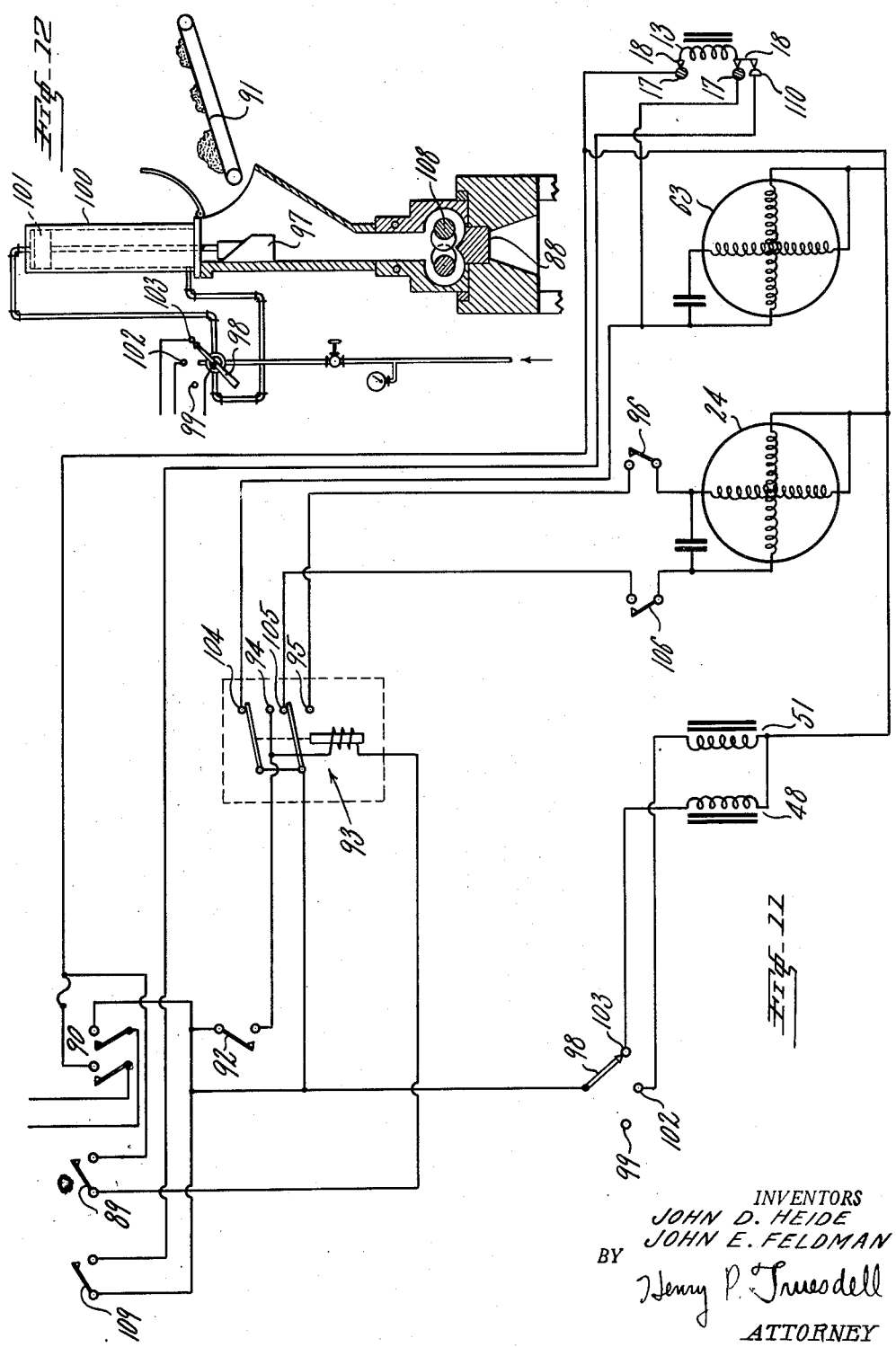

Patented Sept. 30, 1952

2,612,430

UNITED STATES PATENT OFFICE 2,612,430

CYCLE TIME RECORDER

John D. Helde, Ramsey, and John E. Feldman, Garfield, N. J., assignors to United States Rubber Company, New York, N. Y., a corporation of New Jersey Application February 5, 1949, Serial No. 74,752

11 Claims. (Cl. 346—33)

This invention relates to a cycle time recorder and more particularly to a recorder for use with a manually controlled machine to record the various steps performed in a complete cycle of operation of the machine.

One object of the invention is to provide a new and improved recording mechanism capable of making chart records of each complete cycle in a series of operating cycles performed by the machine.

Another object is to provide means whereby the duration and time of occurrence of repeated, similar steps within each cycle may be automatically recorded.

Still another object is to provide an automatic recording mechanism which is quickly reset to initial position and which is capable of graphically presenting information concerning the individual cycles of operation of the machine when the time between cycles is relatively short compared to the total time required for the completion of individual cycles.

A further object is to provide a recording mechanism having a stylus moving at a predetermined speed across a chart with means to return the stylus at a greatly accelerated speed to its initial position. Other objects will be apparent from the description of one embodiment of the invention and its mode of operation hereinafter described.

In the accompanying drawing,

Fig. 3 is a side view of the recorder showing part of the operating gear train;

Fig. 4 is an enlarged view, partly in section, showing details of the pen lifting mechanism;

Fig. 5 is a sectional view of the ink reservoir and pen;

Fig. 6 is a detailed view of the pen shifting solenoid mechanism;

Fig. 7 is a view of the pen assembly driving mechanism taken along the lines 7—7 of Fig. 1;

Fig. 8 is another view of the pen assembly drive mechanism showing the parts in different position;

Fig. 9 is a side view of the pen assembly drive mechanism taken along the line 9—9 of Fig. 7;

Fig. 10 is a view of a portion of a characteristic graph given by the recorder;

Fig. 11 is a diagram of the electrical circuit of the recorder; and

Fig. 12 is a schematic view of a Banbury mixer showing the manner in which the cycle time recorder is connected to and controlled by the operation of the Banbury.

Figures 1, 2:
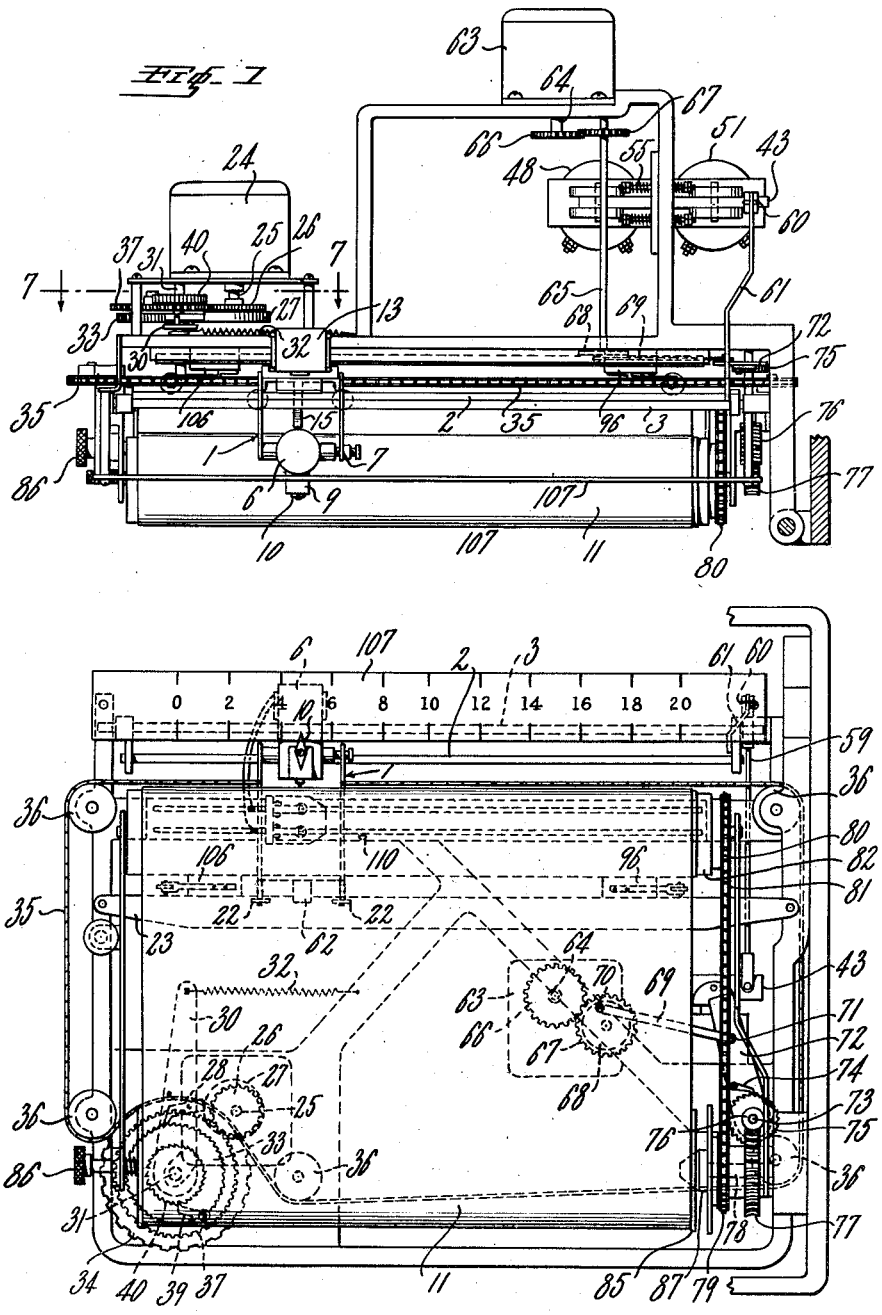
Fig. 1 is a plan view of the cycle recorder.
Fig. 2 is a front view of the recorder showing the chart drive.

One use to which the recorder of the present invention may be put is to record the various cycles of operation of a Banbury mixer used in the processing of rubber compounds. In order to secure a product having uniform quality the loading and mixing cycles of the Banbury machine must be closely checked. The use of the cycle time recorder makes it possible for the operator to accomplish this. The structure of the recorder and the manner in which it is used to record the operating cycles of a Banbury mixer will now be described. It should be manifest, however, that the recorder may be used with other machines.

Turning now to the details of the recorder structure and referring to Fig. 4 of the drawing, a bracket 1 carrying a pen assembly, hereinafter to be described, is slidably mounted on a horizontal rod 2. This rod is suspended at both ends from a fixed support rod 3 by means of hanging supports 4. The ends of both rods pass loosely through these hanging supports so that the lower rod is free to swing in an arc about the upper rod which forms the center of the arc. The upper support rod 3 is fixed to a frame 5.

An ink reservoir 6 is rotatably mounted between the arms of bracket 1 by pivots 7. As shown in Fig. 5, a capillary pen 8 connected to the reservoir is mounted on a counterweight 9, which is fixed to the ink reservoir. A pointer 10 is also mounted on the counterweight. The function of the counterweight 9 is to maintain pen 8 in contact with a paper chart 11 during the tracing operation.

Means are provided to oppose the action of the counterweight and to lift the pen from the paper at the conclusion of a tracing operation. This includes an armature 12, responsive to the action of an electromagnet 13, the armature being pivotally attached to the bracket 1 by the bearing 14. A projection 15 of the armature extends to a point just short of contact with the ink reservoir 6. On energization of the magnet 13, the armature 12 moves projection 15 into contact with the base of the ink reservoir; the resulting rotation of the pen assembly around pivots 7 causes the pen 8 to be lifted from the chart.

The magnet 13 is mounted on a frame 16 which is carried by bracket 1. Electric current is supplied by the conducting rails 17 and is transmitted to the magnet by sliding contacts 18 and wire conductors 19. The sliding contacts are held in contact with the rail conductors by the action of springs 20. Both the rail conductors and the sliding contacts are mounted on insulating supports 21. To oppose the action of the springs 20 and to maintain the pen assembly bracket 1 in position against such spring action restraining means are provided. To this end, guide wheels 22 are carried by the lower end of the bracket and are adapted to contact a rigid guide bar 23 and to roll freely along the surface of such guide bar as the bracket moves along the carrying rod 2. In Fig. 4 however, the guide wheels 22 are shown out of contact with guide bar 23, as will hereafter be described.

Means are provided to move the pen assembly bracket 1 along the carrying rod 2 and to return it to its initial position. To this end, a reversible motor 24 of any suitable type, such as a capacitor motor, is provided with a shaft 25 carrying a spur gear 26 and an eccentric cam 27 (Figs. 7, 8 and 9). In contact with this cam is the base of a pawl 28, pivotally mounted by a pin 29 on an oscillating arm 30. Arm 30 is rotatably mounted on a shaft 31 passing through one end of the arm, but its freedom to rotate about such shaft is limited by the action of a spring 32 connected between the arm and the frame of the machine. The pawl 28 is adapted to engage the teeth of a ratchet wheel 33 as it is moved forward periodically by the action of the cam 27. Thus, it will be seen that periodic rotational motion is imparted to the ratchet wheel 33 and to the shaft 31 to which it is attached. To the end of this shaft there is fixed a sprocket wheel 34 which is meshed with a drive chain 35 (Fig. 7). The ends of the drive chain are connected to opposite sides of the pen assembly 1, as shown in Figs. 1 and 2. The chain runs over a plurality of idler wheels 36 disposed around the frame of the recorder. In this way rotation of the motor will be translated into intermittent or periodic linear motion of the pen in a direction from left to right, in the showing of Fig. 2.

The recorder is provided with means to reverse the linear motion of the pen assembly in a manner now to be described. The aforesaid spur gear 26, fixed to the motor shaft 25, engages a spur gear 37 which is pivotally mounted on shaft 31 so as to be free to rotate in either direction. Projecting from the rear face of gear 37 is a pin 38, forming a pivot for a pawl 39. Said pawl 39 is maintained in contact with a ratchet wheel 40 by the action of coil spring 41 (Fig. 9). The ratchet wheel 40 is rigidly attached to the shaft 31 which transmits its motion to the chain drive sprocket 34. It will be seen that during counterclockwise rotation of the motor (see Fig. 7) the motion of the spur gear 37 causes the pawl 39 to slide over the teeth of the ratchet wheel 40 and to remain thus disengaged for the duration of such motor action while the pen is moving from left to right in Fig. 2. However, during clockwise rotation of said motor (Fig. 8) the motion of spur gear 37 is such as to cause pawl 39 to engage ratchet wheel 40, thereby imparting rotational movement to shaft 31 and chain drive sprocket 34 to move the pen bracket from right to left in the showing of Figs. 1 and 2. The construction is such that the movement of the pen bracket in the return direction is at a much higher speed than its movement from left to right. The motor 24 rotates at the same speed in both the clockwise direction (Fig. 8) and the counterclockwise direction (Fig. 7). However, during clockwise rotation of the motor its rotation is continuously translated into motion of the pen bracket through the gear train comprising gears 26, 37 and ratchet wheel 40. On the other hand, during counter-clockwise rotation, the cam 27 actuates the pawl 28 once each revolution so that the pen bracket advances in a step by step motion. Thus the pen returns to its initial position at a higher speed than that at which it travels during the tracing operation.

In order that the forward driving means be inoperative during the time the reverse driving means are functioning, the frictional interaction of the contacting surface of cam 27 and the forward drive pawl 28 tends to lift said pawl out of engagement with the ratchet 33 during clockwise rotation of the drive motor (see Fig. 8). The pin 42 fixed to reciprocating arm 30 limits the rotation of the pawl and prevents it from turning to the vertical position in which there would be no contact between the pawl and cam 27. Although the cam will continue to cause movement of the arm 30 against the action of spring 32 the disengagement of the pawl and ratchet 33 prevents translation of this movement into rotation of ratchet 33.

Means are provided to move the pen a predetermined distance in either direction at right angles to the line described by the pen in its forward travel across the record sheet, such positions being shown in dotted lines in Fig. 4. Such means includes a walking beam 43 (Figs. 1 and 6) pivotally attached to a rigid frame 44 by a pin 45. Pivotally suspended from a point 46 near one end of the beam is the core 47 of a solenoid 48. The core is partially inserted into the solenoid and the solenoid is fixed to the frame 44. Similarly, at the other end of the beam a second core 49 is suspended from pivot 50. This second core is partially inserted into solenoid 51, also fixed to frame 44. It will be seen that the beam 43 may be rocked about the pivot 45 by the action of either of the solenoids, the direction depending on which solenoid is energized. When neither is energized, the beam is returned to and maintained in the horizontal position by means which includes a projection 52 extending upwardly between plates 53 and 54 separated by a section of the frame 44. Pins 55 extend loosely through the plates and the frame. Close contact of the plates with the frame is maintained by the action of compression springs 56 and 57 carried by the pins 55. It will be seen that energizing either solenoid will result in movement of projection 52, forcing the corresponding plate away from the frame against the action of the compression spring. When the solenoid is de-energized the plate is forced back by the spring into contact with the frame and the projection is returned to the initial center position, thus restoring the beam 43 to its horizontal position.

The motion of the beam thus brought about by the action of the solenoids and springs is transmitted into displacement of the pen in the following manner. Pivotally connected to the beam 43 by the pin 58 is a vertical connecting rod 59, whose upper end is in turn pivotally connected at 60 to horizontal lever 61 (Figs. 3 and 4). This lever is rigidly attached to the hanging support 4 of the pen assembly, heretofore described. It will be seen that motion of the lever 61 will cause the support 4 to rotate about the shaft 3 which, in turn, rocks the supporting rod 2 to move the pen assembly back and forth. Thus upward movement of the lever 61, caused by energizing the solenoid 48, will result in motion of the pen 8 to the left relative to the direction of its forward travel which would be to the left in the showing of Fig. 4. Similarly, energizing solenoid 51 will result in a downward motion of lever 61 and consequent movement of the pen to the right relative to the direction of its forward travel.

The lower end of hanging support 4 describes an arc when it is moved by lever 61. Thus a lifting action is exerted on pen bracket 1 as well as the displacing action described. To the end that the pen bracket be free to move vertically a restraining arm 62 is so mounted that when the bracket is in the center position said arm is not in direct contact with the guide rail 23. When the pen bracket 1 is carried to the left, relative to the forward motion of the pen 8, the arm 62 and the guide rail 23 are brought into slidable contact to form a pivot about which the upper end of the pen bracket rotates as illustrated in Fig. 4. When the bracket is carried to the right, the arm 62 is removed from contact with rail 23 and contact between the guide wheels 22 and guide rail 23 is established to form a pivot for the motion of the bracket to the right.

Means are provided to advance the chart at a constant rate during the period between tracing operations (Figs. 1 and 2). A chart driving motor 63 is preferably of the capacitor-run induction type. The motion of this motor is transmitted by a shaft 64 to a driving gear 66 and thence to a gear 67, fixed to a shaft 65. Mounted on the forward end of shaft 65 is a drive wheel 68 (Fig. 2). One end of a drive rod 69 is pivotally connection by pin 70 to the face of the wheel, the other end being pivotally connected at 71 to a reciprocating arm 72. This arm 72 is free to rotate about a shaft 73. A pawl 74 mounted on the face of the reciprocating arm engages a ratchet 75 which is affixed to the shaft 73. This shaft carries a worm gear 76 which engages and drives gear 77 fixed to shaft 78. Mounted on this shaft is a sprocket wheel 79 which transmits the motion of the shaft to the upper sprocket 80 through a chain drive 81. The upper sprocket 80 is carried by a chart drive roll 82. The rotation of this roll carries the paper chart 11 from a feed roll 83 and over a guide bar 84 to the bottom take-up roll 85 (Fig. 3). This roll 85 is carried between a bearing 86 and a cone-shaped frictional clutch element 87, shown in Fig. 2. The clutch is mounted on the end of shaft 78, but is free to slip under the load. This freedom to slip is necessary because the sprocket 79 is of greater diameter than sprocket 80 and thus the speed of the take-up roll 85 is greater than that of the drive roll 82. The action of the slip clutch permits the exerting of tension on the chart between the drive roll and the take-up roll without danger of tearing.

The invention may be applied to record the cycle of operation of a Banbury mixer. In Fig. 12, a Banbury mixer has been shown in schematic form. At the beginning of the cycle the discharge gate 88 of the mixer is closed, thereby closing a gate switch 89 (Fig. 11), the position of the switch being dependent upon the position of the gate. The line switch 90, connecting the apparatus to the power source, is closed. The materials to be mixed are placed on a conveyor 91. The conveyor control switch 92 is then closed completing the circuit including the said switch, the gate switch 89, the line switch 90 and a relay 93. The relay 93 is energized and the relay circuit is closed through contacts 94 and 95. No current can now flow to the chart drive motor 63 or the pen lift magnet 13, since contacts 104 and 105 are open, with the result that the chart is stationary and the pen is in contact with the chart, contact being maintained by the action of counterweight 9. It will be seen that the conveyor switch 92 can be opened without interrupting the current through relay 93 because of a holding circuit through contact 94. Thus, the conveyor can be started and stopped for the purpose of step-wise addition of material without interfering with the operation of the recorder, as will be shown.

In practice, the operator of the Banbury mixer places the charge of rubber and the compounding ingredients in proper order on the conveyor belt. The conveyor is started, thereby initiating the operation of the mixer, and is stopped when the addition of the rubber is complete. The ram 97 of the mixer is lowered, either under its own weight or under applied pressure and the rubber is then masticated for a given period according to a predetermined schedule. The ram is then raised and the conveyor is started to add a compounding ingredient. The ingredient may be added at once or more slowly by alternately stopping and starting the conveyor. When addition is complete the ram is again lowered and mixing continued for the desired time. Subsequently, additional materials are similarly added and dispersed into the rubber. When the operation is complete the discharge gate of the mixer is opened to remove the compounded rubber.

When the operator begins the mixing operation, conveyor switch 92 is closed to energize the relay 93; this closes contact 95 and permits the flow of current to the pen drive motor 24 through a forward limit switch 96. The motor drives the pen assembly forward by means of the pen advancing mechanism including chain 35 heretofore described. A line is thus traced on the chart, its position on the chart depending upon the position of the ram 97 of the Banbury mixer.

To determine relationship between the position of the traced line and that of the ram, the ram position control valve 98 functions as a three-way switch whose contacts correspond to the position of said ram. Thus, if the ram 97 is in the down position under its own weight the switch is in the neutral position 99. The circuit which includes the pen shifting solenoids 48 and 51 is then inoperative and the pen assembly is maintained in its middle position as heretofore described and the pen traces a line as shown by segments $a'$ of broken line A of Fig. 10. If, however, valve 98 is moved to a position such that the ram is forced down under the pressure of air in the cylinder 100 acting on the piston 101, the circuit is completed through the contact 102 upon turning valve 98 to the proper position. The solenoid 51 is consequently energized. Through the cooperation of the elements of the pen shifting means heretofore described the pen is displaced a predetermined distance in a direction to the right in relation to its forward motion and is maintained in said displaced position during the time the solenoid remains energized This position of the pen is illustrated by segments $a''$, of line A in Fig. 10.

The third contact 103 corresponds to the raised position of the ram. When the circuit is closed through this contact 103, when the operator turns valve 98 to raise the ram for the addition of material, the solnoid 48 is energized. This results in a shift of the pen mechanism to the left through the action of the pen shifting means.

The pen will continue to trace a line in this displaced position, as illustrated by segment $a'''$ of line A of Fig. 10, while the solenoid 48 is energized and will return to the central position upon the de-energizing of said solenoid.

In Fig. 10 the broken lines A, B and C illustrate the graphical record given by the recorder. The distance between the beginning of line A and of line B, for example, is proportional to the time elapsed between the end of the cycle shown by A and the beginning of the cycle shown by B. The segments $a'$, $a''$ and $a'''$ of the line A illustrate the possible positions of the ram as described above. The length of the segments $a'$, $a''$ and $a'''$ is proportional to the length of time during which the ram was maintained at the position indicated. It will be seen that inspection of the chart will indicate whether or not the desired mixing schedule has been adhered to. In addition, it is evident that successive cycles of operation may be readily compared.

At the completion of operation the gate 88 is opened to discharge the contents of the mixer thereby opening the gate switch 89. The relay 93 is thus deenergized and the relay circuits are established through the contacts 104 and 105. The circuits which include the chart drive motor 63 and the pen lift magnet 13 are energized when the contact 104 is closed. As a result the pen is lifted from the paper, terminating the tracing operation, and the paper chart is moved forward by the motor 63 and the cooperating chart advancing means previously described. At the same time, the closing of contact 105 causes current flow to the reversible pen drive motor 24 through the normally closed reverse limit switch 106. The motor is thus reversed, causing the pen drive mechanism to return the pen assembly rapidly to its starting position. When said position is reached the pen carriage contacts said limit switch 106 causing it to open, thus interrupting the current flow through the motor and stopping the pen carriage.

It is believed evident that the chart will continue to be advanced and that the pen will be maintained in the raised position from contact with the chart until the beginning of the next cycle of operation, viz., until the gate switch 89 and the conveyor switch 92 are again closed.

The normally closed forward limit switch 96 is provided to protect the mechanism in case the operation of the Banbury mixer is carried on for a period longer than the apparatus is capable of recording. This limit switch is located in the path of the pen carrying bracket 1 (see Fig. 2). In the event that the operating time exceeds a predetermined limit bracket 1 contacts said limit switch 96 and causes it to open. This interrupts the current flow to the pen drive motor 24 and stops the forward motion of the pen carriage.

A scale 107 (see Fig. 2), mounted on the frame of the apparatus, is marked to indicate units of time in minutes. The pointer 10 mounted on the pen bracket passes in front of the scale, indicating the time elapsed at any point in a cycle and providing a visual guide to the progress of the operation. The indicia on scale 107 correspond to the numerals D appearing on the chart (Fig. 10).

Additional electrical means are provided to indicate, as a part of the graphical record, whether the mixing operation is carried out at normal rotational speed of the rotors 108 of the mixer or under high speed. To that end, an auxiliary circuit is included which includes the switch 109, the contact 110, one of the pair of sliding contacts 18, and the pen lift magnet 13 (see Figs. 4 and 11).

The position of the switch 109 depends on the choice of operating conditions, being opened when the mixing is carried out at normal speed and closed when carried out at a high speed. The contact 110 is mounted on the insulating strip 21 immediately adjacent the lower member of the conducting rails 17 in such a position that it will be contacted by the lower member of the pair of sliding contacts 18 when said sliding contact is carried past this position by the forward motion of the pen carriage. It will be seen that when the switch 109 is closed, the pen lift magnet 13 will be energized when contacts 110 and 18 are brought together, and will remain energized until they are separated by the forward motion of the pen carriage. Thus, the trace resulting when the mixing operation is conducted at high rotor speeds will show a break in the line at some fixed point along its length, the position of such break depending upon the position of the fixed contact 110. This break is indicated by space 111 in line B of Fig. 10. It is apparent that when the mixing is at normal speeds, the trace obtained will show no such break in the line, as in line A of Fig. 10, the switch 109 being open and energizing of the pen lift magnet 13 being thus prevented. Thus in Fig. 10 the line B indicates that the mixing was conducted at high rotor speed, while the absence of the break in line A indicates normal mixing speed.

Having thus described our invention, what we claim and desire to protect by Letters Patent is:

1. In a recording mechanism, a supporting structure including a pen device movable across the face of a chart to trace a line thereon, means for pivotally mounting said supporting structure to move the pen device at right angles to the line, said means including a supporting rod, suspending links pivotally attached to the ends of said rod, a carrying rod pivotally attached to the lower ends of said links, a bracket slideably mounted on said carrying rod, said pen device being pivotally mounted in said bracket, a solenoid, and a lever carried by one of said links and operable by said solenoid to move said carrying rod whereby to cause movement of the pen device.

2. In a recording mechanism, a supporting structure including a pen device movable across the face of a chart to trace a line thereon, means including a link for pivotally mounting said supporting structure to move the pen device at right angles to the line, a walking beam, an armature pivotally connected to one end of said walking beam, a second armature pivotally connected to the opposite end of said walking beam, a lever carried by said link, a rod connecting one end of said walking beam to said lever, said walking beam being operable by either of said solenoids to move the pen device.

3. A system for recording the cycle of operation of a mixer having a discharge gate and a ram movable by fluid pressure comprising, in combination, a scribing mechanism, means for moving said scribing mechanism transversely across the face of a chart to scribe a line thereon during operation of the mixer, means responsive to the starting of a cycle of operation of the mixer to initiate the movement of the scribing means, means responsive to downward movement of said ram under fluid pressure to move said scribing mechanism longitudinally of the chart to provide an offset in the scribed line, means responsive to upward movement of the ram to move said scribing mechanism longitudinally of the chart in the opposite direction to provide an offset in the scribed line and means responsive to the opening of the discharge gate to return said scribing mechanism to its initial position.

4. A system for recording the cycle of operation of a mixer having a discharge gate comprising, in combination, means for supporting and moving a chart, a scribing mechanism, means for moving said scribing mechanism transversely across the face of the chart to scribe a line thereon during operation of the mixer, means responsive to the starting of a cycle of operation of the mixer to initiate the movement of the scribing mechanism, means responsive to the opening of the discharge gate to return said scribing mechanism to its initial position, additional means responsive to the opening of the discharge gate to move the chart longitudinally at a constant rate between successive cycles of operation of the mixer, and means responsive to the starting of a cycle of operation of the mixer to stop the movement of the chart and to maintain it in fixed position during said cycle of operation.

5. A system for recording the cycle of operation of a mixer having a discharge gate and a closing ram movable by fluid pressure comprising, in combination, a scribing mechanism, means for moving said scribing mechanism transversely across the face of a chart to scribe a line thereon during operation of the mixer, said line having a length proportional to the time required to complete the operation, means responsive to the starting of a cycle of operation to initiate the movement of the scribing mechanism, means responsive to downward movement of said ram under fluid pressure to move said scribing mechanism longitudinally of the chart to provide an offset of the scribed line, means responsive to upward movement of the ram to move said scribing mechanism longitudinally of the chart in the opposite direction to provide an offset in the scribed line, and means responsive to the opening of said discharge gate to return said scribing mechanism to its initial position at a rate substantially greater than the rate of its movement during the scribing operation.

6. A system for recording the cycle of operation of a mixer having a discharge gate and a closing ram movable by fluid pressure, comprising in combination, a scribing mechanism, means including a reversible motor for moving said scribing mechanism transversely across the face of a chart to scribe a line thereon during operation of the mixer, means incsluding a relay responsive to the starting of a cycle of operation to initiate the movement of the scribing mechanism, means responsive to downward movement of said ram under fluid pressure to move said scribing mechanism longitudinally of the chart to provide an offset in the scribed line, means responsive to upward movement of the ram under fluid pressure to move said scribing mechanism in the opposite direction to provide an offset in the scribed line, means including said reversible motor and said relay responsive to the opening of said discharge gate to return said scribing mechanism to its initial position, means responsive to the opening of the discharge gate to move the chart longitudinally at a constant rate between successive cycles of operation of the mixer, said means including said relay and a second motor, and means including said relay responsive to the starting of operation of the mixer to stop the movement of the chart.

7. A system for recording the cycle of operation of a mixer having a discharge gate and a closing ram movable under fluid pressure comprising, in combination, a scribing mechanism, means for moving said scribing mechanism transversely across the face of a chart to scribe a line thereon during operation of the mixer, means responsive to the starting of a cycle of operation of the mixer to initiate the movement of the scribing mechanism, manually operated means to control the position of said ram, means responsive to downward movement of said ram to provide an offset in the scribed line, said means including a solenoid, switching means operable by said manually operated means to energize said solenoid, lever means operable by said solenoid to move said scribing means longitudinally of the chart, means responsive to upward movement of said ram to provide an offset in the scribed line in the opposite direction, said means including a second solenoid, switching means operable by said manually operated means to energize said second solenoid, said lever means being operable by said second solenoid to move said scribing means longitudinally of the chart in the opposite direction, and means responsive to the opening of said discharge gate to return said scribing mechanism to its initial position.

8. A system for recording the cycle of operation of a mixer adapted to operate at either of two speeds and having a discharge gate and a ram movable by fluid pressure comprising, in combination, a scribing mechanism, means for moving said scribing mechanism transversely across the face of a chart to scribe a line thereon during operation of the mixer, means responsive to the starting of a cycle of operation of the mixer to initiate the movement of the scribing means, means responsive to downward movement of said ram under fluid pressure to move said scribing mechanism longitudinally of the chart to provide an offset in the scribed line, means responsive to upward movement of the ram to move said scribing mechanism longitudinally of the chart in the opposite direction to provide an offset in the scribed line, means for selecting the operating speed of the mixer, and means responsive to the selection of high speed operation to product an interruption in the scribed line.

9. A system of recording the cycle of operation of a mixer having a discharge gate, a closing ram movable by fluid pressure, and a loading conveyor, comprising, in combination, means for supporting and moving a chart, a scribing mechanism, means for moving said scribing mechanism transversely across the face of the chart to scribe a line thereon, a switch operable by said discharge gate and adapted to be closed by the closing of said gate, a second switch operable by said conveyor and adapted to be closed during operation of said conveyor, a relay adapted to be energized by the closing of said gate controlled switch and of said second switch, means operable on the energizing of the relay to initiate movement of said scribing means, a holding circuit operable on the energizing of said relay to maintain the relay in an energized condition on the opening of said second switch, means responsive to downward movement of said ram under fluid pressure to move said scribing mechanism longitudinally of the chart to provide an offset in the scribed line, means responsive to upward movement of the ram to move said scribing mechanism longitudinally of the chart in the opposite direction to provide an offset in the scribed line, means including said gate controlled switch responsive to the opening of said discharge gate to interrupt said holding circuit whereby to de-energize said relay, means responsive to the de-energizing of said relay to return said scribing mechanism to its initial position, and means responsive to the de-energizing of said relay to move the chart longitudinally at a constant rate between successive cycles of operation.

10. A recording mechanism for providing directly comparable graphical indications of the cycle timing of a series of processes, comprising a scribing means engageable with a chart, driving means for moving said scribing means along said chart from an initial position of said scribing means to scribe a trace on the chart, means for initiating the movement of said scribing means simultaneously with the start of one of said processes, means responsive to the completion of said one process for lifting the scribing means from said chart and means responsive to said completion for returning said scribing means to its initial position, means for moving said chart in a direction perpendicular to the direction of the trace on said chart, means responsive to the completion of said one process for initiation of said chart moving means, and means responsive to the initiation of one of said processes for stopping said chart moving means.

11. A recording mechanism for providing directly comparable graphical indications of the cycle timing of a series of processes, each of said processes being composed of a sequence of steps, comprising a scribing means engageable with a chart, driving means for moving said scribing means along said chart from an initial position of said scribing means to scribe a trace on the chart, means for initiating the movement of said scribing means simultaneously with the start of one of said processes, means responsive to the occurrence of successive steps in said sequence of steps for offsetting said scribing means to provide distinctly offset traces on said chart corresponding to successive steps, means responsive to the completion of said one process for lifting the scribing means from said chart and means responsive to said completion for returning said scribing means to its initial position, means for moving said chart in a direction perpendicular to the direction of the trace on said chart, means responsive to the completion of said one process for initiation of said chart moving means, and means responsive to the initiation of one of said processes for stopping said chart moving means.

JOHN D. HEIDE.
JOHN E. FELDMAN.

REFERENCES CITED

The following references are of record in the file of this patent:

UNITED STATES PATENTS

| Number | Name | Date |
| --- | --- | --- |
| 981,789 | Nicholson | Jan. 17, 1911 |
| 1,182,133 | Benecke | May 9, 1916 |
| 1,523,345 | Madsen | Jan. 13, 1925 |
| 1,656,338 | Ranger | Jan. 17, 1928 |
| 2,215,542 | Chappell et al. | Sept. 24, 1940 |
| 2,346,802 | Walker | Apr. 18, 1944 |
| 2,368,151 | McConnell | Jan. 20, 1945 |
| 2,368,408 | Brooking | Jan. 30, 1945 |
| 2,375,267 | Wise | May 8, 1945 |